United States Patent
Qian et al.

(10) Patent No.: US 11,447,597 B2
(45) Date of Patent: Sep. 20, 2022

(54) TOUGHENED URETHANE ACRYLATE COMPOSITIONS

(71) Applicant: Dow Global Technologies LLC, Midland, MI (US)

(72) Inventors: Huifeng Qian, Pearland, TX (US); Rajat Duggal, Pearland, TX (US); Muhammad A. Shafi, Lake Jackson, TX (US); Luigi Pellacani, Carpi (IT); Harshad M. Shah, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 119 days.

(21) Appl. No.: 16/463,208

(22) PCT Filed: Sep. 7, 2017

(86) PCT No.: PCT/US2017/050475
§ 371 (c)(1),
(2) Date: May 22, 2019

(87) PCT Pub. No.: WO2018/097874
PCT Pub. Date: May 31, 2018

(65) Prior Publication Data
US 2019/0375882 A1    Dec. 12, 2019

(30) Foreign Application Priority Data

Nov. 25, 2016   (IT) .................. 102016000119614

(51) Int. Cl.
| | | |
|---|---|---|
| *C08G 18/76* | (2006.01) | |
| *C08G 18/24* | (2006.01) | |
| *C08G 18/48* | (2006.01) | |
| *C08G 18/67* | (2006.01) | |
| *C09D 11/102* | (2014.01) | |
| *C09D 175/14* | (2006.01) | |
| *C09J 175/14* | (2006.01) | |
| *C08G 18/12* | (2006.01) | |
| *C09D 175/16* | (2006.01) | |
| *C09J 175/16* | (2006.01) | |
| *B29C 55/00* | (2006.01) | |
| *C08J 3/24* | (2006.01) | |

(52) U.S. Cl.
CPC ....... *C08G 18/7664* (2013.01); *C08G 18/246* (2013.01); *C08G 18/4829* (2013.01); *C08G 18/6755* (2013.01); *C08G 18/7621* (2013.01); *C09D 11/102* (2013.01); *C09D 175/14* (2013.01); *C09J 175/14* (2013.01)

(58) Field of Classification Search
None
See application file for complete search history.

(56) References Cited

U.S. PATENT DOCUMENTS

| | | |
|---|---|---|
| 4,246,391 A | 1/1981 | Watson |
| 4,424,333 A | 1/1984 | O'Connor et al. |
| 4,480,079 A | 10/1984 | Orton et al. |
| 4,605,723 A | 8/1986 | Flakus |
| 4,824,919 A | 4/1989 | Baker et al. |
| 9,181,380 B2 | 11/2015 | Panther |
| 2004/0010061 A1 | 1/2004 | Hewitt et al. |
| 2010/0084091 A1 | 4/2010 | Levandoski et al. |
| 2010/0130675 A1 | 5/2010 | Panther |
| 2010/0277884 A1 | 11/2010 | Arifuku et al. |
| 2011/0172359 A1 | 7/2011 | Panther |
| 2015/0099818 A1* | 4/2015 | Rahim ............... C08G 18/4816 522/33 |

FOREIGN PATENT DOCUMENTS

CN    104387551 A  *  3/2015

OTHER PUBLICATIONS

Sigma-Aldrich, "Product Specification—Poly(propylene) glycol 1000," pp. 1-2, https://www.sigmaaldrich.com/specification-sheets/669/804/202320-BULK___ALDRICH_.pdf (2021) (Year: 2021).*
Sigma-Aldrich, "Product Specification—Poly(tetrahydrofuran) 2000," pp. 1-2, https://www.sigmaaldrich.com/specification-sheets/238/914/345326-BULK___ALDRICH_.pdf (2021) (Year: 2021).*
International Search Report and Written Opinion pertaining to PCT/US2017/050475, dated Nov. 29, 2017.

\* cited by examiner

*Primary Examiner* — Randy P Gulakowski
*Assistant Examiner* — Ha S Nguyen
(74) *Attorney, Agent, or Firm* — Dinsmore & Shohl

(57) ABSTRACT

In various embodiments, a resin composition includes a urethane (meth)acrylate, a reactive diluent, and a urethane (meth)acrylate toughener. The urethane (meth)acrylate toughener includes at least one additional polyol having a number average molecular weight Mn of greater than 1,000 g/mol. Cured articles made from the resin composition have an average fracture toughness ($K_{Ic}$) value from 1 MPa*$m^{1/2}$ to 3 MPa*$m^{1/2}$ when measured in accordance with ASTM D5045. Processes for making the resin composition as well as processes using the resin composition are also provided.

16 Claims, No Drawings

TOUGHENED URETHANE ACRYLATE COMPOSITIONS

CROSS-REFERENCE TO RELATED APPLICATIONS

This application claims priority to Italian Patent Application No. 102016000119614 filed on Nov. 25, 2016, the entire disclosure of which is hereby incorporated by reference.

TECHNICAL FIELD

Embodiments of the present disclosure are generally related to urethane acrylate compositions, and are specifically related to urethane acrylate compositions toughened by the inclusion of one or more polyols.

BACKGROUND

The thermosetting resins used in composites mainly include unsaturated polyesters, vinyl esters, epoxies, phenolics, and polyurethanes. Recently, polyurethane resins have attracted broad interest as composite matrix materials, particularly in pultrusion processes. Compared with traditional unsaturated polyesters, vinyl esters and epoxy resins, polyurethane resins offer greater toughness, exceptional durability, and a fast cycle time. Additionally, it is possibly to simplify the reinforcement lay-up and reduce profile thickness by using a polyurethane matrix.

However, the trade off for the improved strength of the polyurethane resins is poor pot life. In particular, the short pot life of two-component polyurethane resins has limited their application in many composite fabrication processes. The high reactivity of two-component polyurethane resins (isocyanate+polyol) allows for fast cycle time of processing, but also reduces the pot life of the resin system. For example, the pot life may typically be less than about 30 minutes. Accordingly, in various composite fabrication processes, the use of polyurethane resins is limited to small or simple composite articles, because of the short pot life of the mixed polyurethane resin and, consequently, the quick increase in viscosity. Pot life, as used herein, is the amount of time it takes for an initial mixed viscosity (i.e., after all the components are brought together) to double for products having a viscosity equal to or greater than 1,000 cPs, or to quadruple for products having a viscosity less than 1,000 cPs. Timing starts from the moment the components are mixed and measured at room temperature (~23° C.).

Accordingly, there is a need for polyurethane resins having increased pot life while maintaining the toughness of conventional two-component polyurethane resins.

SUMMARY

According to one embodiment, a resin composition includes a urethane (meth)acrylate, a reactive diluent, and a urethane (meth)acrylate toughener. The urethane (meth)acrylate toughener includes at least one additional polyol having an average number average molecular weight Mn of greater than about 1,000 g/mol. The resin compositions described herein exhibit good pot life (due to urethane acrylate) with the same strength common in polyurethane resins (due to the toughener).

Embodiments also provide pultrusion processes incorporating such resin compositions, cured articles including the resin compositions, and processes for making such resin compositions.

DETAILED DESCRIPTION

Embodiments are directed to toughened urethane (meth)acrylate resin compositions produced from the reaction of urethane (meth)acrylates with reactive diluents and at least one urethane (meth)acrylate toughener. By reactive diluent it is meant that the polyether polyols may be incorporated into the matrix of the urethane (meth)acrylate. As such, the reactive diluent may essentially avoid being susceptible to evaporation from the composition, as may be typical with non-reactive diluents. The urethane (meth)acrylate toughener (sometimes referred to herein as a "toughener") includes a polyol having a number average molecular weight Mn of greater than 1,000 g/mol. The resultant urethane (meth)acrylate curable resin compositions made using the toughener in the composition provides a one-component urethane (meth)acrylate having a longer pot life as compared to a two-component system, while still obtaining desirable properties (such as toughness, glass transition temperature ($T_g$) and viscosity).

In various embodiments, a formulation for producing a toughened, one component urethane (meth)acrylate composition is provided. In general, the urethane (meth)acrylate can be synthesized through the reaction of an isocyanate component, an isocyanate reacting mixture, and a compound containing both a nucleophilic group and a (meth)acrylate group. The isocyanate reacting mixture includes at least one polyol that reacts with the isocyanate component. A reactive diluent may further be added to the formulation, in various embodiments, as will be described in greater detail below.

In exemplary embodiments, the urethane (meth)acrylate may be prepared by first forming a urethane prepolymer and then adding a capping agent, e.g., as discussed in Italian Application No. 102016000022826. The urethane (meth)acrylate may be a urethane (meth)acrylate composition having a bimodal molecular weight distribution, e.g., as discussed in Italian National Application No. 102016000022845. A curable resin composition including the urethane (meth)acrylate, may also include the reactive diluent, which comprises at least 20 percent by weight of glycols and/or polyols with terminal acrylate or methacrylate groups, and a free radical-generating catalyst, e.g., as discussed in Italian National Application No. 102016000022807. A curable resin composition including the urethane (meth)acrylate, may also include the reactive diluent that is styrene-free, e.g., as discussed in Italian National Application No. 102016000022861. For example, the styrene free reactive diluent may be selected from the group consisting of i) a hydroxyl alkyl (meth)acrylate monomer having a structure of

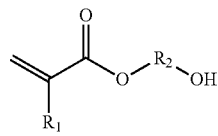

wherein $R_1$ is hydrogen or a methyl group and $R_2$ is an alkylene group containing 2 to 18 carbon atoms per molecule; and ii) optionally a) a (meth)acrylate monomer which does not comprise hydroxyl alkyl (meth) acrylate; and/or b) an aromatic vinyl monomer.

Isocyanate Reacting Mixture

The polyol(s) of the isocyanate reacting mixture may include, for example, polyether polyols, polyester polyols, or combinations thereof. Moreover, the polyols can include polyols of various chain lengths in relation to a desired performance level of the resulting polymer. In some embodiments, a combination of polyols that include at least two polyalkylene glycols having different equivalent weights may be used. For example, a combination of polyols including a short-chain polyalkylene glycol having an equivalent weight of from 50 to 300 g/mol equivalence, from 60 to 290, or from 75 to 250, and a long-chain polyalkylene glycol having an equivalent weight of above 1,000, above 2,000 or even above 3,000 may be employed.

In some embodiments, the isocyanate reacting mixture includes at least one polyether polyol. Various molecular weights are contemplated for the polyether polyol. The polyether polyol may be derived from one or more alkylene oxides such as propylene oxide, ethylene oxide, and/or butylene oxide, as would be understood by a person of ordinary skill in the art. For example, the polyether polyol may be prepared by reacting the one or more alkylene oxides with one or more initiators having from 2 to 10 active hydrogens, in the presence of a polymerization catalyst. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cyclohexane diol, glycerine, timethanoyl propane and triethanolamine.

The polyether polyol may have a number average molecular weight of from about 400 g/mol to about 15,000 g/mol. In some embodiments, the molecular weight is greater than about 400 g/mol or greater than about 1000 g/mol. In other embodiments, the molecular weight may be less than about 15000 g/mol, less than about 10,000 g/mol, or less than about 9,000 g/mol. Accordingly, in some embodiments, the polyether polyol has a molecular weight of from about 425 g/mol to about 8500 g/mol or from about 450 g/mol to about 4000 g/mol. Examples of suitable polyether polyols include, but are not limited to, those commercially available under the trademark VORAPEL™, those commercially available under the trademark VORANOL™ such as VORALUX™ HF505, VORANOL™ 8000LM, VORANOL™ 4000LM, VORANOL™ 1010L, VORANOL™ 220-110, and VORANOL™ 230-660, and those commercially available as Polyglycol P-2000 and Polyglycol P-425, all available from The Dow Chemical Company (Midland, Mich.).

As used herein, a hydroxyl number is the milligrams of potassium hydroxide equivalent to the hydroxyl content in one gram of the polyol or other hydroxyl compound. In some embodiments, the resultant polyether polyol has a hydroxyl number of from about 10 mg KOH/g to about 700 mg KOH/g. In still other embodiments, the resultant polyether polyol has a hydroxyl number of from about 275 mg KOH/g to about 400 mg KOH/g. The polyether polyol may have a nominal hydroxyl functionality of from about 2 or greater (e.g., from 2 to 6, from 2 to 5, from 2 to 4, or 2). The polyether polyol may have an average overall hydroxyl functionality of from about 2 to about 4.5 (e.g., 2 to 3.5). As used herein, the hydroxyl functionality (nominal and average overall) is the number of isocyanate reactive sites on a molecule, and may be calculated as the total number of moles of OH over the total number of moles of polyol.

The viscosity of the polyether polyol is generally less than 2000 mPa*s at 25° C. as measured by ASTM D4878. In some embodiments, the viscosity is between 100 mPa*s and 2000 mPa*s, between 200 mPa*s and 800 mPa*s, or between 300 mPa*s and 500 mPa*s at 25° C.

In some embodiments, the isocyanate reacting mixture includes at least one polyester polyol. Various molecular weights are contemplated for the polyester polyol. The polyester polyol may contain multiple ester groups per molecule and have an average of at least 2 hydroxyl groups per molecule. It may contain up to 6 hydroxyl groups per molecule in some embodiments, but, in other embodiments, will contain up to about 3 hydroxyl groups per molecule. The hydroxyl equivalent weight can range from about 75 to 4000 or from 350 to 1500.

Suitable polyester polyols include reaction products of polyols, for example diols, with polycarboxylic acids or their anhydrides, such as dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols may have an equivalent weight of 150 or less, 140 or less, or 125 or less, and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerin, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful.

In some embodiments, an aliphatic polyester having a hydroxyl functionality of at least 2.0 and a hydroxyl equivalent weight of about 350 to 1500 is included in the isocyanate reacting component. The aliphatic polyester may be a reaction product of an aliphatic dicarboxylic acid (or corresponding acid chloride or diester) with at least one polyol having at least 2 hydroxyl groups and a hydroxyl equivalent weight of 150 or less, and may be branched due to the use of at least one tri- or higher functionality polyol and/or a diol having alkyl side groups (such as neopentyl glycol) as a starting material for the aliphatic polyester.

Isocyanate Component

Various compositions are considered suitable for the isocyanate component. The isocyanate component includes one or more polyisocyanates (as interchangeable referred to as polyisocyanurates) and may optionally include one or more isocyanate-terminated prepolymers derived from one or more polyisocyanates. The amount of isocyanate component may vary based on application.

Exemplary polyisocyanates include aromatic, cycloaliphatic, and aliphatic polyisocyanates. In various embodiments, the isocyanate component has calculated total isocyanate functionality from 1.5 to 5.5. By calculated isocyanate functionality it is meant that the isocyanate functionality is calculated according to the isocyanate functionality of each of the isocyanate-containing components in the isocyanate component and the corresponding weight of each isocyanate-containing component in the isocyanate component. In embodiments, the isocyanate component includes one or more polyisocyanates having a number average molecular weight below 800 g/mol, below 750 g/mol, below 500 g/mol, or even below 250 g/mol.

The isocyanate component may include polyisocyanates or isocyanate-terminated prepolymers derived from such other polyisocyanates. Examples of such polyisocyanates include 4,4'-, 2,4'- and 2,2'-isomers of methane diphenyl diisocyanate (MDI), modifications, and blends thereof (e.g., polymeric or monomeric MDI blends), and 2,4- and 2,6- isomers of toluene-diisocyanate (TDI) (e.g., modifications, and blends thereof). Additional polyisocyanates that may be used include triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate, HMI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexyl propane, 3-isocyanatomethyl-1-methyl-1-isocyanatocyclohexane (MCI), 1,3-diisooctylcyanato-4-methylcyclohexane, 1,3-diisocyanato-2-methylcyclohexane, tetramethylxylylenediisocyanate (TMXDI), 4,6'-xylene diisocyanate (XDI), parapphenylene diisocyanate (PPDI), 3,3'-tolidene 4,4'-diisocyanate (TODI), 3,3'-dimethyl-diphenylmethane 4,4'-diisocyanate (DDI), their adducts, their polymeric forms, and mixtures thereof. Modifications and derivatives of any of the foregoing polyisocyanate groups that contain, e.g., biuret, urea, carbodiimide, allophonate, and/or isocyanurate groups, may be used. Examples of commercial isocyanates suitable for use in various embodiments include the aromatic isocyanates commercially available under the trademarks VORANATE™, such as VORANATE™ T-80 and VORANATE™ M2940, and ISONATE™, such as ISONATE™ M125, all available from The Dow Chemical Company (Midland, Mich.). Other suitable commercially available isocyanates include those available under the trademarks VESTANAT®, such as VESTANAT® IPDI, available from Evonik and DESMODUR®, such as DESMODUR® W, available from Covestro.

The compound containing a nucleophilic group and a (meth)acrylate group may be used to terminate the polyurethane formed from the reaction of the isocyanate component and the isocyanate reacting mixture with a compound containing a nucleophilic group (e.g., hydroxyl, amino, or mercapto) and ethylenically unsaturated functionalities derived from (meth)acrylate. Suitable compounds include, by way of example and not limitation, 2-hydroxyethyl acrylate (HEA), 2-hydroxypropyl acrylate (HPA), 2-hydroxyethyl methacrylate (HEMA), 2-hydroxypropyl methacrylate (HPMA), hydroxyethyl acrylamide, hydroxypropyl acrylamide, and mixtures thereof. In some embodiments, the compound containing a nucleophilic group and a (meth) acrylate group may form part of the reactive diluent in the final resin composition. Commercially available compound containing a nucleophilic group and a (meth)acrylate group that are suitable for use include, for example, ROCRYL™ 410 from The Dow Chemical Company, Midland, Mich.

The urethane (meth)acrylates may be prepared by the so-called "reverse process." In the reverse process, the isocyanate is reacted first with the compound containing the nucleophilic group (e.g. hydroxyl, amino or mercapto) and ethylenically unsaturated functionalities derived from (meth)acrylate, and then with the polyols. The reverse process is described in greater detail in U.S. Pat. No. 4,246,391, which is hereby incorporated by reference in its entirety. Alternatively, a "one step process" may be adopted, in which the isocyanate is reacted simultaneously with a mixture of the polyol and the compound containing the nucleophilic group (e.g. hydroxyl, amino or mercapto) and ethylenically unsaturated functionalities derived from (meth)acrylate. However, in various embodiments, the urethane (meth)acrylate is prepared by a two-step reaction.

In the first step, polyurethane oligomers are prepared by reacting the isocyanate component with the isocyanate reacting mixture. For example, one or more polyisocyanates is reacted with a mixture of polyols. In various embodiments, the polyisocyanate is mixed with the polyols in an equivalent ratio of NCO:OH from 1.4:1 to 5.0:1, using standard procedures, to yield an isocyanate-terminated prepolymer with controlled molecular weight. Any and all ranges between 1.4:1 and 5.0:1 are included herein and disclosed herein. For example the NCO:OH ratio can range from about 1.4:1 to about 3.0:1 or from about 1.4:1 to about 2.3:1.

In the second step, the polyurethane oligomers with free terminal isocyanate groups (also referred to as the isocyanate-terminated prepolymers) are capped with the compound containing a nucleophilic group and a (meth)acrylate group using methods known in the art. For example, the compound containing a nucleophilic group and a (meth) acrylate group may be provided in a stoichiometric excess with respect to the isocyanate component. The excess compound may function as a reactive diluent, which lowers the viscosity of the urethane acrylate composition and cross-links with the (meth)acrylate adduct during formation of the polymer.

In various embodiments, the percent of free NCO (NCO %) in the final urethane (meth)acrylate is generally in the range of from 0% to 0.1%. Any and all ranges between 0% and 0.1% are included and disclosed herein. For example, in some embodiments, the NCO % is from 0% to 0.0001%.

In some embodiments, a commercially available urethane (meth)acrylate may be used in the resin composition. Suitable commercially available urethane (meth)acrylates include, by way of example and not limitation, CN 1963, CN9167, CN 945A60, CN 945A70 CN 944B85, CN 945B85, CN 934, CN 934X50, CN 966A80, CN 966H90, CN 966J75, CN 968, CN 981, CN 981A75, CN 981B88, CN 982A75, CN 982B88, CN 982E75, CN 982P90, CN 983B88, CN 985B88, CN 970A60, CN 970E60, CN 971A80, CN 972, CN 973A80, CN 977C70, CN 975, CN 978, all available from Sartomer. Mixtures thereof can also be used.

The resin composition may include 1 wt % to 99 wt % urethane (meth)acrylate based on a total weight of the resin composition, or 10 wt % to 90 wt % urethane (meth)acrylate. All individual values and subranges from 1 to 99 wt % are included and disclosed herein. For example, the resin composition may include at least 1, 5, 10, 15, 25, 30, 35, 40, 50, or 55 wt % and less than 60, 65, 70, 75, 80, 85, 90, or 99 wt % urethane (meth)acrylate based on a total weight of the resin composition. For example, the resin composition may include 1 wt % to 99 wt % urethane (meth)acrylate, 30 wt % to 80 wt % urethane (meth)acrylate, or 40 wt % to 65 wt % of urethane (meth)acrylate.

A urethane toughener is also included in the resin composition. In embodiments, the urethane toughener is included in an amount of from 0.1 wt % to 20 wt %, from 0.5 wt % to 10 wt %, or from 1 wt % to 5 wt % based on the total weight of the resin composition. All individual values and subranges from 0.1 wt % to 20 wt % are included and disclosed herein. For example, the resin composition may include at least 0.1 wt %, 0.25 wt %, 0.5 wt %, 0.75 wt %, 1 wt %, or 1.5 wt % and less than 20 wt %, 15 wt %, 12.5 wt %, 10 wt %, 9 wt %, 8 wt %, 7 wt %, 6 wt %, or 5 wt % urethane toughener based on a total weight of the resin composition. For example, the resin composition may include from 0.1 wt % to 20 wt % of the urethane toughener, from 0.1 wt % to 5 wt % of the urethane toughener, or 1 wt % to 5 wt % of the urethane toughener.

In various embodiments, the urethane toughener includes one or more polyols having a number average molecular weight Mn of greater than 1,000 g/mol. In some embodiments, the urethane toughener has a number average molecular weight Mn of greater than 3,000 g/mol. For example, in some embodiments, the urethane toughener has a number average molecular weight Mn of from 3,500 g/mol to 8,500 g/mol. The polyol(s) of the urethane toughener may include polyester polyols, polyether poloyols, or combinations thereof. Suitable polyether and polyester polyols include, by way of example and not limitation, the polyols provided hereinabove as being suitable for use in the isocyanate reacting mixture. Commercially available polyols that are particularly well suited as urethane tougheners in various embodiments include those available under the trademark VORANOL™, such as VORANOL™ 8000LM, VORANOL™ 4000LM, VORANOL™ 1010L, and VORALUX™ HF505, and those commercially available as Polyglycol P-2000, all available from The Dow Chemical Company (Midland, Mich.).

In some embodiments, a reactive diluent can be added simultaneously with the capping agent or afterwards. The reactive diluent is a liquid reaction medium containing at least one ethylenic double bond, and is used to reduce the viscosity of the mixture to a predetermined viscosity.

The reactive diluent is a liquid reaction medium containing at least one ethylenic double bond. The reactive diluent is curable by polymerization in the existence of free radical catalyst. Examples of such reactive diluents are styrene, vinyl toluene, divinyl benzene and (meth)acrylates such as methyl methacrylate, tert-butyl methacrylate, iso-butyl methacrylate, hydroxyethyl acrylate, hydroxypropyl acrylate, hydroxyethyl methacrylate, hydroxypropyl methacrylate, hydroxyethyl acrylamide, hydroxypropyl acrylamide, and mixtures thereof. Other reactive diluents that can be used are glycols and/or polyether polyols with terminal acrylate or methacrylate groups, thus carrying two or more ethylenic double bonds: preferred diluents include 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, tripropylene glycol diacrylate, ethoxylated bisphenol A diacrylate, trimethylolpropane triacrylate, pentaerythritol triacrylate, pentaerythritol tetraacrylate, their corresponding methacrylate analogues, and all other related derivatives. Mixtures of any of the reactive diluents above can also be used.

In an exemplary embodiment, the reactive diluent may include the glycols and/or polyols with terminal acrylate or methacrylate groups. Accordingly, in some embodiments, glycols and/or polyether polyols with terminal acrylate or methacrylate groups make up at least 20 wt % of the total reactive diluent composition. Some embodiments may include at least 50 wt % glycols and/or polyether polyols with terminal acrylate or methacrylate groups or at least 80 wt % glycols and/or polyether polyols with terminal acrylate or methacrylate groups. The remaining 80 wt % or less of the total reactive diluent composition may include mono-functional radical polymerizable monomers carrying one acrylate-reactive unsaturated functional group selected from the group of vinyl, allyl, cyclic allyl, cyclic vinyl, functionalized and non-functionalized acrylic, acrylamides, acrylonitrile, and combinations thereof. Examples of such reactive diluents are vinyl toluene, divinyl benzene and (meth)acrylates such as methyl methacrylate, tert-butyl methacrylate, iso-butyl methacrylate, hydroxyethyl acrylate, hydroxypropyl acrylate, hydroxyethyl methacrylate, hydroxyethyl acrylamide, hydroxypropyl acrylamide, styrene, and mixtures thereof.

In various embodiments, the resin composition may include from 1 wt % to 99 wt % of reactive diluents. All individual values and subranges from 1 wt % to 99 wt % are included and disclosed herein. For example, the resin composition may include greater than 1 wt %, greater than 5 wt %, greater than 10 wt %, greater than 15 wt %, greater than 20 wt %, greater than 25 wt %, greater than 30 wt %, greater than 40 wt %, greater than 50 wt %, or greater than 55 wt % of the reactive diluent and less than 60 wt %, less then 65 wt %, less than 70 wt %, less than 75 wt %, less than 80 wt %, less than 90 wt %, less than 95 wt %, or less than 99 wt % of the reactive diluent. In some embodiments, the resin composition includes from 1 wt % to 99 wt % of the reactive diluent, from 10 wt % to 90 wt % of the reactive diluent, or from 35 wt % to 60 wt % of the reactive diluent.

In embodiments, the reactive diluent is curable by polymerization in the presence of a free radical-generating catalyst. Thus, optionally, a free radical-generating catalyst can be added along with the reactive diluent. Suitable free radical-generating catalysts include peroxide or azo type compounds. Peroxide compounds include, but are not limited to organo peroxides and hydroperoxides such as tert-Butyl peroxyneodecanoate, benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Azo compounds include, but are not limited to azobis-isobutyronitrile, 2-t-butylazo-2-cyano-4-methylpentane, and 4-t-butylazo-4-cyano-valeric acid. Without being bound by theory, it is believed that the free radical-generating catalyst serves as a source of free radicals, which may be released upon heating or through an interaction with an accelerator. Combinations of different peroxides may be employed, such as peroxides which release free radicals upon heating to a certain temperature in combination with peroxides that release radicals upon heating to a higher temperature. Examples of suitable commercial peroxides that may be used include those commercially available under the trademarks TRIGONOX® and PERKADOX® from Akzo Nobel.

When a free radical-generating catalyst is included, the resin composition may include from 0.001 wt % to 10 wt % of the free radical-generating catalyst based on a total weight of the resin composition. All individual values and subranges from 0.001 to 10 wt % are included and disclosed herein. For example, the free radical-generating catalyst may be included in an amount of greater than 0.001, 0.05, 0.1, or 0.5 wt % and in an amount less than 1, 1.5, 2, 2.5, 3, 3.5, 4, 4.5, 5, 6, 7, 8, 9, or 10 wt %. For example, the resin composition may include from 0.001 wt % to 10 wt % of the free radical-generating catalyst, from 0.05 wt % to 2 wt % of the free radical-generating catalyst, from 0.1 wt % to 1 wt % of the free radical-generating catalyst, from 0.3 wt % to 2 wt % of the free radical-generating catalyst, from 0.5 wt % to 1 wt % of the free radical-generating catalyst, or from 0.1 wt % to 5 wt % of the free radical-generating catalyst.

The resin composition may further include additives or other modifiers. For example, catalysts, inhibitors, activators, accelerators, and gel time retarders may be employed. Catalysts may include, by way of example and not limitation, amine catalysts, tin catalysts, and the like. The amount of catalyst may be from about 0.005 wt % and 5 wt % of the resin composition, depending on the nature of the isocyanate and/or depending on whether the catalyst is provided in a carrier, as would be understood by a person of ordinary skill in the art. In some embodiments, the resin composition includes from about 1 wt % to about 2 wt % of the catalyst based on the weight of the resin composition. Tin catalysts may include tin salts, such as the stannous salts of carboxylic acids. In one particular embodiment, the catalyst is dibutyltin dilaureate. Amine catalysts may include, by way of example and not limitation, tertiary amine catalysts. Tertiary amine catalysts include organic compounds that contain at least one tertiary nitrogen atom and are capable of catalyzing the hydroxyl/isocyanate reaction between the isocyanate component and the isocyanate reacting mixture.

Additionally, in some embodiments, an inhibitor can be added to avoid the free radical polymerization of (meth) acrylates during storage. Suitable inhibitors include, by way of example and not limitation, (2,2,6,6-Tetramethylpiperidin-1-yl)oxyl (TEMPO), Mono Methyl Ether of Hydroquinone (MEHQ), dihydroxybenzenes, benzoquinones, hindered phenols, and hindered phenols based on triazine derivatives. In various embodiments, the resin composition includes 50 to 10000 ppm, or 100 to 1000 ppm, of an inhibitor based on the total weight of the resin composition.

Activators may be included in the resin composition. In various embodiments, activators are metal carboxylates capable of increasing the effectiveness of the free radical-generating catalyst, consequently improving the degree of polymerization of the resin. Examples of activators include metal carboxylates, and cobalt salts such as cobalt napthenate, and they may be used at a level of about 0.01 wt % to 1 wt % based on a total weight of the resin composition.

Accelerators are another ingredient that can effectively increase the speed and completeness of the radical polymerization of the resin composition. The accelerator may be selected from the group of anilines, amines, amides, pyridines, and combinations thereof. Another example of an accelerator, not selected from the group of anilines, amines, amides, and pyridines is acetylacetone. In various embodiments, the accelerator, if included, includes a dimethyl toluidine or a dialkyl aniline. In various other embodiments, the accelerator, if included, includes N,N-dimethyl-p-toluidine, N,N-diethylaniline, N,N-dimethylaniline, and combinations thereof. If present, the accelerator is generally present in an amount of from 0.01 wt % to 0.5 wt % based on a total weight of the resin composition.

In some embodiments, the resin composition may also include a gel time retarder. Addition of a gel time retarder decreases the gel time of the urethane acrylate composition. If included, the gel time retarder is generally selected from the group of diones, naphthenates, styrenes, and combinations thereof. In various embodiments, if included, the gel time retarder includes 2,4-pentanedione. In various other embodiments, if included, the gel time retarder is included in an amount of from 0.01 wt % to 0.3 wt % based on a total weight of the resin composition.

Other ingredients may be also included in the resin composition, such as internal mold release agents, fillers, and the like. For example, internal mold release agents may be included to facilitate the release of the polymerized composite article from the mold in which it has been prepared. When included, the internal mold release agents may be present in an amount from about 0.1 wt % to about 5 wt % based on a total weight of the resin composition. Examples of suitable internal mold release agents include those available for composite applications from Axel Plastics Research Laboratories, Inc. (Woodside, N.Y.) or from E. and P. Würtz GmbH & Co. KG (Germany).

Fillers may be used for a number of different reasons, such as to provide pigmentation, flame retardance, insulation, thixotropicity, aid with dimensional stability and physical properties, and reduced cost of the composite structure. Suitable fillers for the urethane acrylate composition include reactive and non-reactive conventional organic and inorganic fillers. Examples include, but are not limited to, inorganic fillers, such as calcium carbonate, silicate minerals, for example, both hollow and solid glass beads, phyllosilicates such as antigorite, serpentine, hornblends, amphiboles, chrysotile, and talc; metal oxides and hydroxides, such as aluminum oxides, aluminum hydroxide, titanium oxides and iron oxides; metal salts, such as chalk, barite and inorganic pigments, such as cadmium sulfide, zinc sulfide and glass, inter alia; kaolin (china clay), and aluminum silicate and co-precipitates of barium sulfate and aluminum silicate. Examples of suitable organic fillers include, but are not limited to, carbon black and melamine. Thixotropic agents that are useful in this invention include fumed silica, organoclays, inorganic clays and precipitated silica. The amount of filler used will depend of the type of filler and reason for its presence in the system. Accordingly, the thixotropic agents are often used at levels of up to about 2 wt %, while fillers that have a flame retardant action such as aluminum hydroxide, may be used in much larger amounts, such as in amounts that are comparable or even larger than the amount of resin, including the urethane (meth)acrylate plus the reactive diluent.

Other additives having specific functions, as known in the industry, may also be included in the resin composition, including but not limited to, air release agents, adhesion promoters, leveling agents, wetting agents, UV absorbers and light stabilizers.

In various embodiments, the urethane (meth)acrylate resin composition is prepared by blending a urethane (meth) acrylate with a urethane (meth)acrylate toughener. The urethane (meth)acrylate may be prepared as described above. For example, in some embodiments, the urethane (meth) acrylate is prepared by preparing polyurethane oligomers by reacting at least one isocyanate with an isocyanate reacting mixture that includes at least one polyol, and capping at least some free terminal isocyanate groups of the polyurethane oligomers with a compound containing a nucleophilic group and a (meth)acrylate group. A reactive diluent and, optionally, other additive, may be added to the urethane (meth) acrylate before or after blending the urethane (meth)acrylate with the urethane (meth)acrylate toughener. In some embodiments, the urethane (meth)acrylate toughener is blended with the urethane (meth)acrylate after the reactive diluent is added.

Upon reacting, the mixture produces a urethane (meth) acrylate polymer which is then allowed to cure, either partially or fully. Suitable conditions for promoting the curing of the urethane (meth)acrylate resin composition include a temperature of from about 15° C. to about 150° C. In some embodiments, the urethane (meth)acrylate resin composition may be curable at temperatures near room temperature, for example, from about 15° C. to about 30° C. In some embodiments, the curing is performed at a temperature of from about 20° C. to about 75° C. In other embodiments, the curing is performed at a temperature of from about 20° C. to about 60° C. In various embodiments, the temperature selected for curing may be selected at least in part based on the amount of time required for the urethane (meth)acrylate resin composition to gel and/or cure at that temperature. Cure time will also depend on other factors, including, for example, the particular components (e.g., catalysts and quantities thereof), and the thickness of the article to be cured.

In various embodiments, the toughened urethane (meth) acrylates may be suitable for various fabrication processes, including but not limited to, pultrusion, filament winding, resin transfer molding (RTM), infusion, and cured-in-place pipe processes. Cured articles that may be prepared from the resin compositions described herein include composites, coatings, adhesives, inks, encapsulations, or castings. Suitable applications for composites prepared from the resin compositions of various embodiments may include, for example, used in wind turbines, boat hulls, truck bed covers, automobile trim and exterior panels, pipe, tanks, window liners, seawalls, composite ladders, and the like.

In some embodiments, a pultrusion process includes drawing pre-selected reinforcement materials, such as fiberglass roving, mat or cloth, through a resin bath in which the reinforcement material is thoroughly impregnated with a toughened urethane (meth)acrylate resin composition. The wet-out fiber is formed to the desired geometric shape and pulled into a heated steel die. Once inside the die, curing of the toughened urethane (meth)acrylate resin is initiated by controlling the temperature within the die. The laminate solidifies in the shape of the die, as it is continuously pulled by the pultrusion machine.

Additional insights into the toughened urethane (meth)acrylate polymer may be provided by the following properties. The toughened urethane (meth)acrylate resin composition may have an average fracture toughness ($K_{IC}$) value from 1 MPa*m$^{1/2}$ to 3 MPa*m$^{1/2}$ when measured in accordance with ASTM D5045, a viscosity of less than 10,000 cp, and/or a glass transition temperature, $T_g$, of from 50° C. to 170° C. In some embodiments, the toughened urethane (meth)acrylate resin composition has a viscosity of greater than 50 cp, or from 100 cp to 1,000 cp.

Procedures and Test Methods

Plaque Preparation of Urethane Acrylate

The mold was made from "U"-shaped, 4 mm thick aluminum spacers positioned between two sheets of Duofoil aluminum and compressed between two thick heavy metal plates. The mold was coated with a proprietary release agent. A rubber tubing was used for gasket material following the inside dimensions of the spacer. Once assembled, the mold was clamped together with multiple C-clamps. The open end of the "U"-shaped spacer faced upward and the Duo-foil extended to the edge of the metal plates. The top edge of the Duo-foil was higher than the edge of the metal plates and was bent for the filling of the reaction mixture. The internal volume of the mold was 10 cm×20 cm×0.4 cm. After the mold was filled with the toughened urethane (meth)acrylate resin, it was cured at room temperature (approximately 21° C.) for 1 hour and then placed in an oven for curing at 150° C. for 1 hour.

Viscosity Analysis

The viscosity was measured on an AR2000 rheometer from TA Instruments. Approximately 1 mL of sample was dispensed into 45 mm cone-plate geometry. After removal of any excess material, the viscosity test was performed by heating the sample to 25° C. Shear rate of the test was kept constant at 10.0 s$^{-1}$.

Dynamic Mechanical Thermal Analysis

The glass transition temperature, $T_g$, was determined by Dynamic Mechanical Thermal Analysis (DMTA) in accordance with ASTM D4065-12 using an ARES rheometer from TA Instruments. Rectangular samples (approximately 6.35 cm×1.27 cm×0.32 cm) were placed in solid state fixtures and subjected to an oscillating torsional load. The samples were thermally ramped from about −80° C. to about 200° C. at a rate of 3° C./minute and 1 Hz frequency.

FT-IR Analysis

The FTIR spectrum was collected using a Nicolet Nexus 670 infrared spectrometer equipped with a DuraScope single bounce diamond attenuated total reflectance (ATR) accessory. Approximately 15 mg of sample was transferred to the ATR and the infrared spectrum from 4000 to 650 cm$^{-1}$ was collected using a resolution of 4 cm$^{-1}$ and 16 scans.

Determination of Isocyanate Content (ASTM D5155-Test Method C)

The isocyanate content determination (% NCO) was performed according to ASTM D5155 (standard test method for polyurethane raw materials: determination of the isocyanate content of aromatic isocyanates—method C) using a Mettler DL55 autotitrator equipped with two titration stands, two solvent pumps and an autosampler carousel. The sample was dissolved in trichlorobenzene and mixed with a known excess of dibutylamine in toluene. The resulting solution was stirred for 20 minutes and then diluted with methanol. The solution was titrated potentiometrically with standardized 1.0 N hydrochloric acid (aqueous) using a 20 mL burette. A blank analysis was performed, in duplicate, using the method described above but without adding the sample. The average of the blank analysis was used to calculate the % NCO using the following formula:

$$\% \, NCO = \frac{(B-S)N \times 4.202}{W}$$

where B is volume in mL of acid consumed by blank (duplicate average), S is the volume in mL of acid consumed by sample, N is the normality of acid, 4.202 is the equivalent weight of the isocyanate (NCO) moiety adjusted for conversion to percent, and W is the weight in g of the sample.

Three-Point Flexure, Tensile, and Fracture Toughness

Three-point flexure tests were performed in accordance with ASTM D790 using a standard 16:1 span-to-thickness ratio. The thickness of the sample was about 0.1 inch and the span was about 1.6 inches.

Tensile tests were performed in accordance with ASTM D638 (type I).

Fracture toughness ($K_{IC}$) of materials was measured in accordance with ASTM D5045 using an Instron 5567 screw-driven material testing machine. Compact-tension geometry was used.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

PAPI™ 94 is a polymeric methylene diphenyl diisocyanate (MDI) having an average molecular weight 325 and an average isocyanate functionality 2.5, available from The Dow Chemical Company (Midland, Mich.)

VORANATE™ T-80 is an 80/20 blend of the 2,4 and 2,6 toluene diisocyanate (TDI) isomers, available from The Dow Chemical Company (Midland, Mich.);

VORANOL™ 4000LM is a polyether polyol, having a functionality of 2 and a number average molecular weight of 4,000 g/mol available from The Dow Chemical Company (Midland, Mich.);

VORANOL™ 220-110 is a propylene glycol-initiated polyether polyol, having a nominal hydroxyl functionality of 2, a hydroxyl number of 110 mg KOH/g, a number average molecular weight of 1,000 g/mol, and a viscosity at 25° C. of 160 cP available from The Dow Chemical Company (Midland, Mich.);

VORALUX™ HF505 is a sorbitol initiated polyoxypropylene polyol capped with about 16 wt % ethylene oxide having a hydroxyl equivalent weight of about 1902, and is available from The Dow Chemical Company (Midland, Mich.);

VORANOL™ 230-660 is a 250 molecular weight polyether triol available from The Dow Chemical Company (Midland, Mich.);

VORANOL™ 8000LM is a propylene glycol-initiated polyether polyol, having a nominal hydroxyl functionality of 2 and a number average molecular weight of 8,000 g/mol, available from The Dow Chemical Company (Midland, Mich.);

Polyglycol P-425 is a polypropylene glycol having a number average molecular weight of 425, available from The Dow Chemical Company (Midland, Mich.);

HEMA is 2-hydroxyethyl methacrylate, and is included as a (meth)acrylate capping agent;

DABCO™ T-12 is dibutyltin dilaurate (DBTDL), a urethane catalyst available from Air Products;

ROCRYL™ 410 is hydroxypropyl methacrylate (HPMA) available from The Dow Chemical Company (Midland, Mich.);

TEMPO is (2,2,6,6-Tetramethylpiperidin-1-yl)oxyl, a free-radical inhibitor;

Tripropylene Glycol (TPG) is available from The Dow Chemical Company (Midland, Mich.); and VT is vinyl toluene, a reactive diluent available from Deltech Corporation.

Table 1 below lists Examples 1-4, which are four example embodiments of the present formulations that include a urethane toughener, and Comparative Example A, which is a urethane (meth)acrylate resin composition that does not include a urethane toughener.

TABLE 1

Table 1: Composition Formulations

| Composition | Comp. Ex. A | Ex. 1 | Ex. 2 | Ex. 3 | Ex. 4 |
|---|---|---|---|---|---|
| PAPI™ 94 | 23.58 | 23.58 | 23.58 | 23.58 | 23.58 |
| VORANOL™ 4000LM | 4.34 | 4.34 | 4.34 | 4.34 | 4.34 |
| VORANOL™ 220-110 | 4.34 | 4.34 | 4.34 | 4.34 | 4.34 |
| Polyglycol P-425 | 8.68 | 8.68 | 8.68 | 8.68 | 8.68 |
| HEMA | 33.86 | 33.86 | 33.86 | 33.86 | 33.86 |
| DABCO™ T-12 | 0.01 | 0.01 | 0.01 | 0.01 | 0.01 |
| TEMPO | 0.01 | 0.01 | 0.01 | 0.01 | 0.01 |
| VT | 25.18 | 25.18 | 25.18 | 25.18 | 25.18 |
| VORANOL™ 8000LM | 0 | 1.0 | 3.0 | 5.0 | 0 |
| VORANOL™ 4000LM | 0 | 0 | 0 | 0 | 3.0 |

The urethane acrylate of Comparative Example A and Examples 1-4 was prepared in three steps. First, the urethane prepolymer was prepared by adding PAPI™ 94, VORANOL™ 4000LM, VORANOL™ 220-110, and Polyglycol P-425 to a flask. The reaction was kept at 70° C.-80° C. for two hours, and the progress of the reaction was monitored using wt % NCO titration. The urethane prepolymer synthesis was deemed complete when the wt % NCO was within ±0.2% of the target wt % NCO.

Next, the urethane prepolymer was capped with HEMA. In particular, HEMA was premixed with TEMPO and added to the reaction flask containing the urethane prepolymer. The reaction was kept at 60° C.-70° C. for two hours. Then, DABCO™ T-12 catalyst was added to the flask. The reaction was kept at 60° C.-70° C. for an additional 30 minutes. Reaction progress was monitored by the disappearance of the NCO signal (2271 cm$^{-1}$) by FTIR. Once the signal was no longer detectable, the capping was deemed complete.

Finally, the urethane acrylate was diluted with vinyl toluene. In particular, vinyl toluene was added to the reaction flask, and the contents of the flask were mixed at 40° C.-50° C. for 30 minutes.

For each of Examples 1-4, the toughener was then added to the flask, and the mixture was blended at 40° C.-50° C. for 30 minutes to obtain a homogeneous resin.

Cured plaques were prepared as described above using the compositions of Comparative Example A and Examples 1-4. Specifically, 1 wt % TRIGONOX® 239 (tert-butyl peroxyneodecanoate; available from AkzoNobel) and 0.1% cobalt octoate (12 wt % cobalt in cobalt octoate) was used as a free-radical catalyst. The plaques were cured for 1 hour at room temperature followed by 1 hour at 150° C. The cured plaques were then cut by waterjet.

Comparative Example B was a cured plaque prepared as described above prepared using a system that consists of VORAFORCE™ TP 1250/TP 1200/TM 3500/TC 4000, which is composite polyurethane pultrusion system commercially available from The Dow Chemical Company (Midland, Mich.).

The fracture toughness ($K_{IC}$) of each sample was measured according to ASTM D5045 using a screw-driven material testing machine (Instron Model 5567). In addition, three-point flexure, tensile strength, viscosity, and $T_g$ were measured. The results are reported in Table 2.

TABLE 2

Table 2: Summary of Fracture Toughness, Mechanical Properties, Viscosity, and $T_g$

| | $K_{Ic}$ (MPa * m$^{1/2}$) | Flex Strength (MPa) | Flex Modulus (MPa) | Flex Strain (%) | Tensile Strength (MPa) | Tensile Modulus (MPa) | Tensile Strain (%) | Viscosity | Tg (° C., tan δ, DMTA) |
|---|---|---|---|---|---|---|---|---|---|
| Comp. Ex. A | 0.65 | 143 | 3558 | 5.79 | 74 | 2855 | 7.52 | 0.51 | 114 |
| Comp. Ex. B | 1.3 | 106 | 2700-2900 | 9-10 | 54 | 2600 | 6.4 | 1.2-1.3 | 130 |

TABLE 2-continued

Table 2: Summary of Fracture Toughness, Mechanical Properties, Viscosity, and $T_g$

|  | $K_{Ic}$ (MPa * m$^{1/2}$) | Flex Strength (MPa) | Flex Modulus (MPa) | Flex Strain (%) | Tensile Strength (MPa) | Tensile Modulus (MPa) | Tensile Strain (%) | Viscosity | Tg (° C., tan δ, DMTA) |
|---|---|---|---|---|---|---|---|---|---|
| Ex. 1 | 1.34 | 125 | 3155 | 5.53 | 70 | 2620 | 5.5 | 0.53 | 119 |
| Ex. 2 | 1.83 | 114 | 2851 | 5.87 | 65.2 | 2362 | 6.5 | 0.59 | −71 & 123 |
| Ex. 3 | 2.09 | 107 | 2899 | 5.95 | 61.7 | 2307 | 5.3 | 0.65 | −70 & 114 |
| Ex. 4 | 1.63 | 110 | 2782 | 5.59 | 66.1 | 2438 | 6.0 | 0.56 | −51 & 118 |

As shown in Table 2, each of the toughened urethane acrylates in Examples 1-4 exhibits a fracture toughness ($K_{IC}$) value of at least twice the fracture toughness of the untoughened urethane acrylate of Comparative Example A. Moreover, each of the toughened urethane acrylates of Examples 1-4 exhibited similar viscosity, flex strain, and tensile strain, increased $T_g$, compared to the untoughened urethane acrylate of Comparative Example A.

In addition, each of the toughened urethane acrylates of Examples 1-4 showed comparable fracture toughness ($K_{IC}$) and improved pot life as compared to the two-component polyurethane of Comparative Example B, making them viable alternatives to the existing two-component systems. Specifically, the pot life of Example 1-4 is up to 24 hours, whereas the pot life of VORAFORCE™ TP 1250/TP 1200/TM 3500/TC 4000 is only about 30 minutes.

Table 3 below lists Example 5, which is an additional example embodiment of the present formulations that include a urethane toughener, and Comparative Example C, which is a urethane (meth)acrylate resin composition that does not include a urethane toughener.

The urethane acrylates in Table 3 were prepared in three steps. First, the urethane prepolymer was prepared by adding VORONATE™ T-80, VORALUX™ HF505, Polyglycol P-425, tripropylene glycol, and VORANOL™ 230-660 were added to a flask. The reaction was kept at 70° C.-80° C. for two hours. Reaction progress was monitored using wt % NCO titration. The urethane prepolymer synthesis was deemed complete when wt % NCO was within ±0.2% of target wt % NCO.

Next, the urethane prepolymer was capped with ROCRYL™ 410 Hydroxypropyl Methacrylate (HPMA). In particular, HPMA was premixed with TEMPO and added to the flask containing the urethane prepolymer. The reaction was kept at 60° C.-70° C. for two hours. Then, DABCO™ T-12 catalyst was added to the flask. The reaction was kept at 60° C.-70° C. for an additional 30 minutes. Reaction progress was monitored by the disappearance of the NCO signal (2271 cm$^{-1}$) by FTIR. Once the signal was no longer detectable, the capping was deemed complete.

Finally, the urethane acrylate was diluted with vinyl toluene. In particular, vinyl toluene was added to the reaction flask, and the contents of the flask were mixed at 40° C.-50° C. for 30 minutes.

For Example 5, the toughener (3 wt % VORANOL™ 8000LM) was then added to the flask, and the mixture was blended at 40° C.-50° C. for 30 minutes to obtain a homogeneous resin.

Cured plaques were prepared as described above using the compositions of Comparative Example C and Example 5. Specifically, 1 wt % TRIGONOX® 239 (tert-butyl peroxyneodecanoate; available from AkzoNobel) and 0.1% cobalt octoate (12 wt % cobalt in cobalt octoate) was used as a free-radical catalyst. The plaques were cured for 1 hour at room temperature followed by 1 hour at 150° C. The cured plaques were then cut by waterjet. The fracture toughness ($K_{IC}$) of each sample was measured according to ASTM D5045 using a screw-driven material testing machine (Instron Model 5567). The results are reported in Table 3.

TABLE 3

Composition Formulations

| Components | Composition | Comp. Ex. C | Ex. 5 |
|---|---|---|---|
| Urethane (meth)acrylate | VORANATE™ T-80 | 20.3 | 20.3 |
|  | VORALUX™ HF505 | 9.32 | 9.32 |
|  | Polyglycol P-425 | 3.28 | 3.28 |
|  | Tripropylene Glycol (TPG) | 3.28 | 3.28 |
|  | VORANOL™ 230-660 | 3.28 | 3.28 |
|  | ROCRYL™ 410 (HPMA) | 44.29 | 44.29 |
|  | TEMPO | 0.03 | 0.03 |
|  | DABCO™ T-12 | 0.01 | 0.01 |
|  | VT | 16.21 | 16.21 |
| Toughener | VORANOL™ 8000LM |  | 3.03 |
| $K_{IC}$ (MPa * m$^{1/2}$) |  | 0.61 | 1.58 |

As with the previous examples, the toughened urethane acrylate of Example 5 exhibits a fracture toughness of at least two times that of the untoughened urethane acrylate of Comparative Example C.

Various embodiments described herein exhibit improved fracture toughness over conventional urethane acrylates, and higher fracture toughness ($K_{IC}$), improved mechanical properties and lower viscosity as compared to two-component polyurethane systems. Accordingly, various embodiments described herein may be employed in composite applications where two-component polyurethane systems are problematic because of their short pot life. In particular, various embodiments exhibit a pot life of up to about 24 hours, while the pot life of conventional polyurethane is about 30 minutes.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A resin composition comprising:
   a urethane (meth)acrylate produced from the reaction of at least one polyisocyanate, a combination of polyols comprising at least two polyalkylene glycols having different hydroxyl equivalent weights, and a compound comprising a nucleophilic group and a (meth)acrylate group, wherein the at least two polyols include a polyalkylene glycol having a hydroxyl equivalent weight of from 50 to 300 and a polyalkylene glycol having a hydroxyl equivalent weight of above 1,000;
   a reactive diluent; and
   a urethane (meth)acrylate toughener comprising at least one additional polyol having a number average molecular weight Mn from 1,000 g/mol to 15,000 g/mol,
   wherein the at least one additional polyol is present in an amount of from 1.0 wt % to 5.0 wt % based on a total weight of the curable resin composition.

2. The resin composition of claim 1, wherein the compound comprising the nucleophilic group and the (meth)acrylate group is selected from the group consisting of hydroxyethyl acrylate, hydroxypropyl acrylate, hydroxyethyl methacrylate, hydroxyethyl acrylamide, hydroxypropyl acrylamide, and mixtures thereof.

3. The resin composition of claim 1, further comprising a free radical-generating catalyst in an amount of from 0.1 wt % to 5 wt % based on a total weight of the resin composition.

4. The resin composition of claim 1, wherein the at least one additional polyol has a number average molecular weight Mn from 3,500 g/mol to 9,000 g/mol.

5. A cured article comprising a composite, a coating, an adhesive, an ink, an encapsulation, or a casting prepared from a resin composition, the resin composition comprising:
   a urethane (meth)acrylate produced from the reaction of at least one polyisocyanate, a combination of polyols comprising at least two polyalkylene glycols having different hydroxyl equivalent weights, and a compound comprising a nucleophilic group and a (meth)acrylate group, wherein the at least two polyalkylene glycols include a polyalkylene glycol having an equivalent weight of from 50 to 300 and a polyalkylene glycol having a hydroxyl equivalent weight of above 1,000;
   a reactive diluent; and
   a urethane (meth)acrylate toughener comprising at least one additional polyol having a number average molecular weight Mn from 1,000 g/mol to 15,000 g/mol,
   wherein the at least one additional polyol is present in an amount of from 1.0 wt % to 5.0 wt % based on a total weight of the curable resin composition.

6. The cured article of claim 5, wherein the cured article has an average fracture toughness (KIC) value from 1 MPa*m$^{1/2}$ to 3 MPa*m$^{1/2}$ when measured in accordance with ASTM D5045.

7. A method of preparing a resin composition, comprising:
   reacting a polyisocyanate, a combination of polyols comprising at least two polyalkylene glycols having different hydroxyl equivalent weights, and a compound containing both a nucleophilic group and a (meth)acrylate group to form urethane (meth)acrylate, wherein the at least two polyalkylene glycols include a polyalkylene glycol having a hydroxyl equivalent weight of from 50 to 300 and a polyalkylene glycol having a hydroxyl equivalent weight of above 1,000; and
   mixing a reactive diluent and a urethane (meth)acrylate toughener with the urethane (meth)acrylate to form the resin composition, wherein
   the urethane (meth)acrylate toughener comprises at least one additional polyol having a number average molecular weight Mn from 1,000 g/mol to 15,000 g/mol, and
   the at least one additional polyol is present in an amount of from 1.0 wt % to 5.0 wt % based on a total weight of the curable resin composition.

8. The method of claim 7, wherein the method further comprises curing the resin composition at a temperature from 15° C. to 150° C.

9. The method of claim 8, wherein the cured resin composition comprises an average fracture toughness (KIC) value from 1 MPa*m$^{1/2}$ to 3 MPa*m$^{1/2}$ when measured in accordance with ASTM D5045.

10. The method of claim 7, wherein the resin composition comprises a viscosity of less than 10,000 cp.

11. The method of claim 8, wherein the cured resin composition comprises a glass transition temperature, $T_g$, from 50° C. to 170° C.

12. The resin composition of claim 1, wherein the resin composition is a cured resin composition further comprising an average fracture toughness (KIC) value from 1 MPa*m$^{1/2}$ to 3 MPa*m$^{1/2}$ when measured in accordance with ASTM D5045.

13. The resin composition of claim 1, further comprising a viscosity of less than 10,000 cp.

14. The resin composition of claim 1, wherein the resin composition is a cured resin composition further comprising a glass transition temperature, $T_g$, from 50° C. to 170° C.

15. The cured article of claim 5, wherein the resin composition, when uncured, comprises a viscosity of less than 10,000 cp.

16. The cured article of claim 5, wherein the resin composition is a cured resin composition comprising a glass transition temperature, $T_g$, from 50° C. to 170° C.

* * * * *